US012678696B2

(12) United States Patent
Zhang

(10) Patent No.: US 12,678,696 B2
(45) Date of Patent: Jul. 14, 2026

(54) VIRTUAL OBJECT INTERACTION METHOD, NON-TRANSITORY STORAGE MEDIUM AND ELECTRONIC DEVICE

(71) Applicant: NETEASE (HANGZHOU) NETWORK CO., LTD., Hangzhou (CN)

(72) Inventor: Qichuan Zhang, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 192 days.

(21) Appl. No.: 18/578,759

(22) PCT Filed: May 31, 2022

(86) PCT No.: PCT/CN2022/096420
§ 371 (c)(1),
(2) Date: Jan. 12, 2024

(87) PCT Pub. No.: WO2023/029626
PCT Pub. Date: Mar. 9, 2023

(65) Prior Publication Data
US 2024/0382851 A1 Nov. 21, 2024

(30) Foreign Application Priority Data
Aug. 30, 2021 (CN) .......................... 202111004857.7

(51) Int. Cl.
*G06Q 30/02* (2023.01)
*A63F 13/2145* (2014.01)
(Continued)

(52) U.S. Cl.
CPC ........ *A63F 13/577* (2014.09); *A63F 13/2145* (2014.09); *A63F 13/537* (2014.09); *A63F 13/837* (2014.09)

(58) Field of Classification Search
CPC .. A63F 13/577; A63F 13/2145; A63F 13/537; A63F 13/837; A63F 13/219; A63F 13/426; A63F 13/53
See application file for complete search history.

(56) References Cited

U.S. PATENT DOCUMENTS

2006/0252538 A1* 11/2006 Olsen ...................... A63F 13/45
463/36
2015/0157940 A1* 6/2015 Hall .................... A63F 13/5372
463/31

(Continued)

FOREIGN PATENT DOCUMENTS

CN 108404407 A 8/2018
CN 109847336 A 6/2019
(Continued)

OTHER PUBLICATIONS

"Taleworlds Forum" (published Apr. 11, 2020 at https://forums.taleworlds.com/index.php?threads/improvement-better-way-of-showing-attack-direction-crosshair-for-melee-weapons.412535/) (Year: 2020).*

(Continued)

*Primary Examiner* — James M Detweiler
(74) *Attorney, Agent, or Firm* — Qinghong Xu

(57) ABSTRACT

A virtual object interaction method, a non-transitory computer-readable storage medium, and an electronic device are provided. The method includes: displaying an adsorbable area on a graphical user interface in response to a touch operation acting on a first short-range interaction skill control, wherein the graphical user interface is provided by a terminal device and comprises a virtual scene and at least one short-range interaction skill control; locking a target virtual object in the virtual scene according to an orientation of a crosshair in the adsorbable area; adsorbing the target virtual object in response to a release operation acting on the (Continued)

Display an adsorbable area on a graphical user interface in response to a touch operation acting on a first short-range interaction skill control — S210

Lock a target virtual object in the virtual scene according to an orientation of a crosshair in the adsorbable area — S220

Adsorb the locked target virtual object in response to a release operation acting on the first short-range interaction skill control — S230

Perform collision detection for the adsorbed target virtual object, and initiate interaction with the target virtual object according to a result of the detection — S240 first short-range interaction skill control; and performing collision detection for the target virtual object, and initiating interaction with the target virtual object according to a result of the detection.

16 Claims, 11 Drawing Sheets

(51) Int. Cl.
  *A63F 13/537*       (2014.01)
  *A63F 13/577*       (2014.01)
  *A63F 13/837*       (2014.01)

(56) References Cited

U.S. PATENT DOCUMENTS

| | | | |
|---|---|---|---|
| 2015/0231509 A1 | 8/2015 | McMain, II et al. | |
| 2021/0101074 A1* | 4/2021 | Hemby | G09G 5/377 |
| 2021/0245062 A1* | 8/2021 | Wu | G06T 19/003 |
| 2021/0275914 A1* | 9/2021 | Wu | A63F 13/577 |
| 2022/0040579 A1* | 2/2022 | Hu | A63F 13/5375 |
| 2023/0182018 A1* | 6/2023 | Kano | A63F 13/533 |
| | | | 463/31 |

FOREIGN PATENT DOCUMENTS

| | | | |
|---|---|---|---|
| CN | 109917910 A | 6/2019 | |
| CN | 110548286 A | 12/2019 | |
| CN | 110841276 A | 2/2020 | |
| CN | 110917623 A | 3/2020 | |
| CN | 110935173 A | 3/2020 | |
| CN | 111054066 A | 4/2020 | |
| CN | 111202975 A | 5/2020 | |
| CN | 112717384 A | 4/2021 | |
| JP | 2005071285 A | 3/2005 | |
| JP | 2006314763 A | 11/2006 | |
| JP | 2008272123 A | 11/2008 | |
| JP | 2018117867 A | 8/2018 | |
| JP | 2020039403 A | 3/2020 | |
| WO | 2016205918 A1 | 12/2016 | |
| WO | 2020173256 A1 | 9/2020 | |
| WO | 2021120823 A1 | 6/2021 | |

OTHER PUBLICATIONS

1st Office Action dated Jul. 30, 2024 of Japanese Application No. 2023-549970.
1st Office Action dated May 30, 2025 of Chinese Application No. 2021110048577.
International Search Report dated Sep. 2, 2022 of International Application No. PCT/CN2022/096420.

* cited by examiner

100

103

102

101

104

105

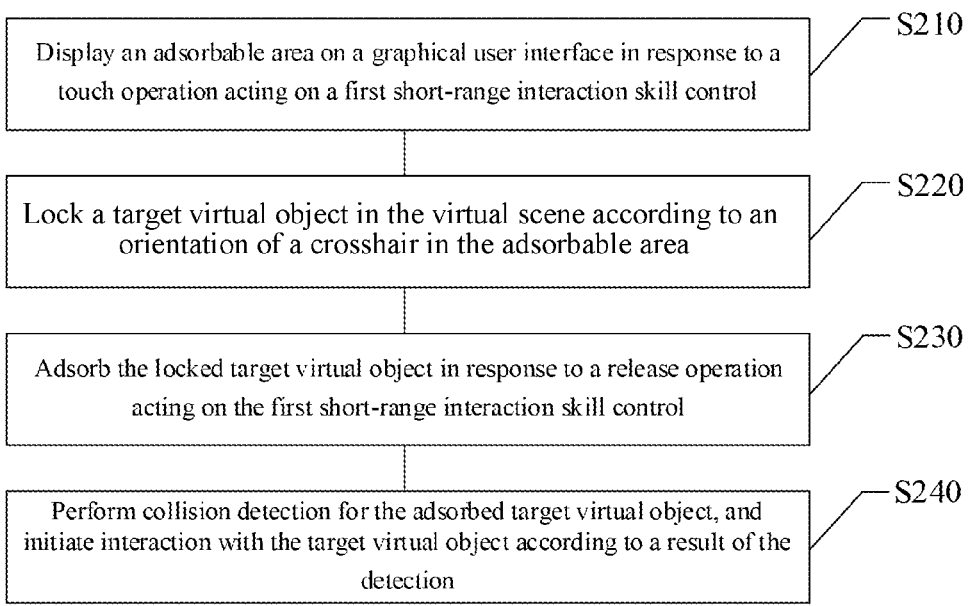

Display an adsorbable area on a graphical user interface in response to a touch operation acting on a first short-range interaction skill control

S210

Lock a target virtual object in the virtual scene according to an orientation of a crosshair in the adsorbable area

S220

Adsorb the locked target virtual object in response to a release operation acting on the first short-range interaction skill control

S230

Perform collision detection for the adsorbed target virtual object, and initiate interaction with the target virtual object according to a result of the detection

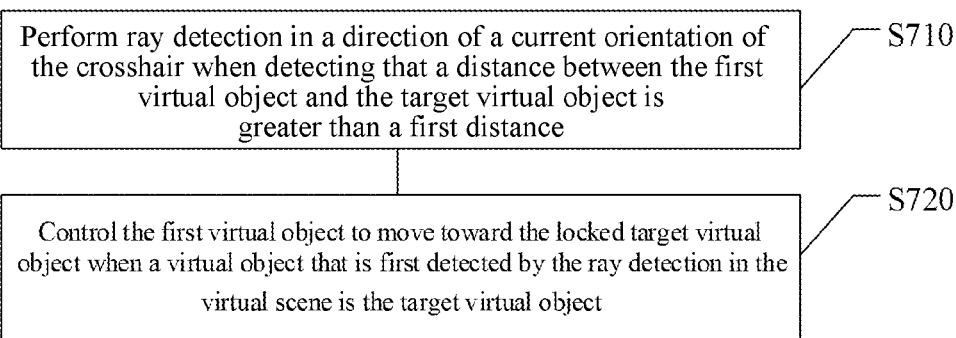

Perform ray detection in a direction of a current orientation of the crosshair when detecting that a distance between the first virtual object and the target virtual object is greater than a first distance — S710

Control the first virtual object to move toward the locked target virtual object when a virtual object that is first detected by the ray detection in the virtual scene is the target virtual object — S720

FIG.7

Perform collision detection for the first virtual object and the target virtual object through a collision detection box ⟋ S810

Adjust the interaction with the target virtual object according to a real-time detection result ⟋ S820

VIRTUAL OBJECT INTERACTION METHOD, NON-TRANSITORY STORAGE MEDIUM AND ELECTRONIC DEVICE

CROSS-REFERENCE TO RELATED APPLICATION

The present disclosure is a U.S. National Phase Application of PCT International Application No. PCT/CN2022/096420, filed on May 31, 2022, which is based on and claims priority to Chinese Patent Application No. 202111004857.7, entitled "AVATAR INTERACTION METHOD AND APPARATUS, AND STORAGE MEDIUM AND ELECTRONIC DEVICE", filed on Aug. 30, 2021, the entire contents of both of which are incorporated herein by reference for all purposes.

TECHNICAL FIELD

The present disclosure relates to the field of computer technologies, and in particular, to a virtual object interaction method, a virtual object interaction device, a non-transitory computer-readable storage medium, and an electronic device.

BACKGROUND

With the development of computer technologies and the diversification of terminal functions, increasing types of games can be played on terminals, among which shooting games are very popular games. In the shooting games, a terminal displays a virtual scene in an interface and displays a virtual object in the virtual scene. A user controls the virtual object through the terminal to battle with other virtual objects.

Due to a narrow field of view in the shooting games, aiming is generally required in attacking targets, and the virtual object generally stands far away, rendering long-range shooting to be a main battle manner, and accordingly, the users pay less attention to short-range battles.

It should be noted that the information disclosed above in this background section is only used to facilitate understanding of the background of the present disclosure, and therefore may include information that does not constitute the related art known to those skilled in the art.

SUMMARY

According to a first aspect of the present disclosure, there is provided a virtual object interaction method, and the method includes:

displaying an adsorbable area on a graphical user interface in response to a touch operation acting on a first short-range interaction skill control, wherein the graphical user interface is provided by a terminal device and comprises a virtual scene and at least one short-range interaction skill control;

locking a target virtual object in the virtual scene according to an orientation of a crosshair in the adsorbable area;

adsorbing the locked target virtual object in response to a release operation acting on the first short-range interaction skill control; and performing collision detection for the adsorbed target virtual object, and initiating interaction with the target virtual object according to a result of the detection.

According to a second aspect of the present disclosure, there is provided a non-transitory computer-readable storage medium having stored thereon a computer program which, when being executed by a processor, implements the virtual object interaction method as described above.

According to a third aspect of the present disclosure, there is provided an electronic device, including: a processor; and a memory configured to store instructions executable by the processor, where the processor is configured to perform the virtual object interaction method as described above by executing the executable instructions.

It should be understood that the above general description and the following detailed description are merely exemplary and explanatory, and should not limit the present disclosure.

BRIEF DESCRIPTION OF THE DRAWINGS

The drawings herein are incorporated in and constitute a part of the specification, illustrate embodiments consistent with the present disclosure, and together with the description serve to explain principles of the present disclosure. Apparently, the drawings in the following description are only some embodiments of the present disclosure. For those of ordinary skill in the art, other drawings may be obtained based on these drawings without paying any creative effort.

FIG. 2 schematically illustrates a flowchart of a virtual object interaction method according to an embodiment of the present disclosure:

FIG. 7 schematically illustrates a flowchart of adsorbing a target virtual object according to an embodiment of the present disclosure:

DETAILED DESCRIPTION

Figure 1:
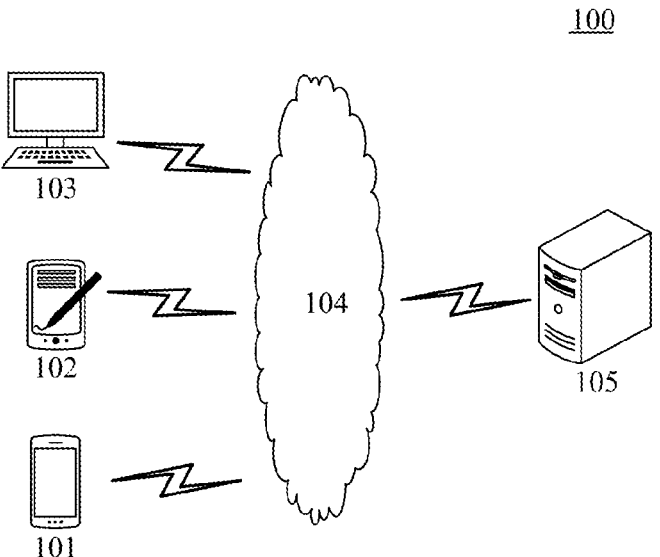
FIG. 1 illustrates a schematic diagram of an illustrative system architecture in which a virtual object interaction method and device according to an embodiment of the present disclosure can be applied.

Exemplary embodiments will now be described more fully with reference to the accompanying drawings. However, the exemplary embodiments may be implemented in a variety of forms and should not be construed as being limited to examples set forth herein; rather, these embodiments are provided so that the present disclosure will be more complete and comprehensive so as to comprehensively convey the concept of the exemplary embodiments to those skilled in this art. The described features, structures, or characteristics may be combined in any suitable manner in one or more embodiments. In the description below, numerous specific details are set forth to provide a thorough understanding of embodiments of the present disclosure. However, those skilled in the art will appreciate that the technical solution of the present disclosure may be practiced without one or more of the specific details, or other methods, components, devices, steps and the like may be employed. In other instances, well-known technical solutions are not shown or described in detail to avoid obscuring various aspects of the present disclosure.

In addition, the drawings are merely schematic illustrations of the present disclosure and are not necessarily drawn to scale. The same reference numerals in the drawings denote the same or similar parts, and the repeated description thereof will be omitted. Some of the block diagrams shown in the figures are functional entities and do not necessarily correspond to physically or logically separate entities. These functional entities may be implemented in software, or implemented in one or more hardware modules or integrated circuits, or implemented in different networks and/or processor devices and/or microcontroller devices.

First, some nouns or terms that appear in the description of embodiments of the present disclosure will be explained.

Virtual scene: it is a virtual scene displayed (or provided) when an application is running on a terminal or server. In some embodiments, the virtual scene is a simulation environment for the real world, or a semi-simulated and semi-fictional virtual environment, or a pure fictional virtual environment. The virtual scene can be any one of a two-dimensional virtual scene and a three-dimensional virtual scene. The virtual environment can be sky, land, ocean, etc., where the land includes deserts, cities and other environmental elements. The virtual scene is a scene where the user controls a virtual object to complete a game logic. For example, in a sandbox-type 3D shooting game, the virtual scene is a 3D game world for a player to control a virtual object for battle, and an example virtual scene may include at least one of elements such as mountains, plain, rivers, lakes, oceans, deserts, sky, plant, buildings, and vehicles. For a 2D or 3D multi-player online tactical competitive game, the virtual scene is a 2D or a 3D terrain scene for the virtual objects to battle, and an example virtual scene may include elements such as canyon-style mountains, lines, rivers and others.

Virtual object: it refers to a dynamic object that can be controlled in the virtual scene. In some embodiments, the dynamic object may be a virtual character, a virtual animal, an animated character, or the like. The virtual object is a character controlled by a game player through an input device, or an artificial intelligence (AI) that has been trained to battle in a virtual environment, or a non-player character (NPC) that has been set in the virtual scene battle. In some embodiments, the virtual object is a virtual character competing in a virtual scene. In some embodiments, the number of virtual objects in the virtual scene battle may be preset or may be dynamically determined according to the number of clients participating in the battle, which is not limited in the embodiments of the present disclosure. In an implementation of the present disclosure, the user can control the virtual object to move in the virtual scene, such as running, jumping, crawling, etc. in the virtual scene, and can also control the virtual object to use a skill, a virtual prop, etc., provided by the application so as to fight with other virtual objects.

FIG. 1 illustrates a schematic diagram of a system architecture of an illustrative application environment in which a virtual object interaction method and device according to an embodiment of the present disclosure can be applied.

As shown in FIG. 1, the system architecture 100 may include one or more of terminal devices 101, 102, 103, a network 104 and a server 105. The network 104 is a medium used to provide communication links between the terminal devices 101, 102, 103 and the server 105. The network 104 may include various types of connection, such as wired or wireless communication links, fiber optic cables, or the like. The terminal devices 101, 102, and 103 may be various electronic devices, including but not limited to desktop computers, portable computers, smart phones, tablet computers, etc. Taking the terminal device 101 as an example, the terminal device 101 may be installed with and run an application that supports a virtual scene. In some embodiments, the application may include any one of a First-Person Shooting (FPS) game, a third-person shooting game, or a multi-player gun battle survival game. When the terminal device 101 runs the application, a graphical user interface of the application may be displayed on a screen of the terminal device 101, and a virtual scene of a game round at the current phase is loaded and displayed in the application based on a user's operation of starting the game round in the graphical user interface. Specifically, the terminal device 101 may be configured to: display an adsorbable area on the graphical user interface in response to a touch operation acting on a first short-range interaction skill control: lock a target virtual object in the virtual scene according to an orientation of a crosshair in the adsorbable area: adsorb the locked target virtual object in response to a release operation acting on the first short-range interaction skill control; and perform collision detection for the adsorbed target virtual object, and initiate interaction with the target virtual object according to a result of the detection. It should be understood that the numbers of the terminal devices, networks and servers in FIG. 1 are only illustrative, and according to implementation requirements, there may be any number of terminal devices, networks and servers. For example, the server 105 may be a single server, or may be a server cluster composed of a plurality of servers, a cloud computing platform or a virtualization center. In addition, the server 105 may be configured to provide background services for applications that support virtual scenes.

The crosshair displayed may be of different forms and styles, such as a dot, a circle, a cross, etc., and the crosshair may be static or dynamic depending on the application scenarios and actual requirements.

A virtual object interaction method provided by the embodiments of the present disclosure is generally performed by one or more of the terminal devices 101, 102, and 103, and correspondingly, a virtual object interaction device is generally provided in the terminal device 101, 102, or 103. However, those skilled in the art can easily understand that the virtual object interaction method provided by the embodiments of the present disclosure may also be performed by the server 105, and correspondingly, the virtual object interaction device may also be provided in the server 105, which are not specially limited in embodiments of the present disclosure.

The technical solutions of embodiments of the present disclosure are described in detail below:

In shooting games, a terminal displays a virtual scene in an interface and displays a virtual object in the virtual scene.

The user controls the virtual object through the terminal to battle with other virtual objects. Due to a narrow field of view in the shooting games, aiming is generally required in attacking targets, and the virtual object generally stands far away, rendering the long-range shooting to be the main battle manner, and accordingly, the users pay less attention to short-range battles.

At present, when controlling the virtual object for the short-range battle, the user can directly initiate an attack on a target virtual object by triggering a melee skill. In the entire short-range interaction process, distance and aiming issues are not taken into consideration, resulting in a low probability of hitting the target, which reduces the user's operation experience. For example, the lack of aiming time makes it more difficult to hit the target. In another example, when the target is far away, it is difficult to hit the target and it is impossible to determine whether the target can be hit. In still another example, it is also difficult to hit the target when the target is moving.

In view of one or more of the above problems, embodiments of the present disclosure provide a virtual object interaction method, which may be applied to one or more of the above-mentioned terminal devices 101, 102, 103, and may also be applied to the above-mentioned server 105, which is not particularly limited in the embodiments of the present disclosure. The virtual object interaction method may be applied to a terminal device, the terminal device is configured to provide a graphical user interface, and the graphical user interface may include a virtual scene and at least one short-range interaction skill control. For example, the graphical user interface may include a field-of-view picture of a game, and the field-of-view picture of the game may include at least part of a game scene and at least part of a first virtual object and other virtual objects located in the game scene. The terminal device may be a local terminal device or a client device in a cloud interactive system. Referring to FIG. 2, the virtual object interaction method may include the following steps S210 to S240.

In step S210, in response to a touch operation acting on a first short-range interaction skill control, an adsorbable area is displayed on the graphical user interface.

In step S220, a target virtual object is locked in the virtual scene according to an orientation of a crosshair in the adsorbable area.

In step S230, in response to a release operation acting on the first short-range interaction skill control, the locked target virtual object is adsorbed.

In step S240, collision detection is performed for the adsorbed target virtual object, and interaction with the target virtual object is initiated according to a result of the detection.

In the virtual object interaction method provided by the embodiments of the present disclosure, the adsorbable area is displayed on the graphical user interface in response to the touch operation acting on the first short-range interaction skill control: the target virtual object is locked in the virtual scene according to the orientation of the crosshair in the adsorbable area: the locked target virtual object is adsorbed in response to the release operation acting on the first short-range interaction skill control; and the collision detection is performed for the adsorbed target virtual object, and the interaction with the target virtual object is initiated according to the result of the detection. In one aspect, when a user controls a virtual object to initiate a short-range interaction, aiming, locking and adsorbing the target virtual object are supported, which provides a new short-range interaction manner. In another aspect, during the short-range interaction process, a target hit rate can be improved by aiming, locking and adsorbing the target virtual object, thereby improving the user's operating experience. In still another aspect, the adsorption target can be determined based on the real-time collision detection, further optimizing the user's operating experience in the use of the short-range interaction skill.

The above steps in the embodiments of the present disclosure will be described in more detail in the following.

In step S210, in response to the touch operation acting on the first short-range interaction skill control, the adsorbable area is displayed on the graphical user interface.

In an embodiment of the present disclosure, the first-person shooting game may be taken as an example for explanation. The first-person shooting game refers to a shooting game that the user can play from a first-person perspective, and a virtual environment picture in the game is a picture where the virtual environment is observed from the perspective of the first virtual object. Specifically; an application that supports the virtual scene is installed on the terminal device, that is, the application for the first-person shooting game may be installed on the terminal device, so that when the terminal device runs the application, it may display, on the screen of the terminal device, the picture where the virtual scene is observed from the first-person perspective, as well as a variety of controls such as the short-range interaction skill control, a long-range shooting skill control, etc. The user may control the first virtual object through the terminal device, and a virtual object that interacts with the first virtual object is the target virtual object. It can be understood that the virtual object interaction method described in the present disclosure may also be applied to third-person shooting games or multi-player gun battle survival games, etc., which is not specifically limited in the present disclosure.

In an implementation, when the target virtual object is located in a first target interaction area, the user may perform a touch operation on the first short-range interaction skill control displayed on the screen of the terminal device to control the first virtual object to prepare to initiate the interaction with the target virtual object. The first target interaction area may be a short-range interaction area determined by a first interaction radius. For example, the first interaction radius may be a physical distance between the first virtual object and the crosshair, and a magnitude of the first interaction radius may be configured according to actual needs. The corresponding first target interaction area may be a cone-like area with the first interaction radius as a central axis.

As an example, the touch operation may be a long press operation, a sliding operation, etc., and the terminal device may display the adsorbable area on the graphical user interface in response to the touch operation. The adsorbable area may be the first target interaction area in the three-dimensional space, but from the user's perspective, the adsorbable area may be a two-dimensional plane area obtained by mapping the first target interaction area in the three-dimensional space. When the target virtual object is located in the two-dimensional plane area, the first virtual object may initiate the interaction with the target virtual object. Preferably, the adsorbable area may be a circular area obtained by the mapping of the first target interaction area, and an outline portion of the circular area is displayed on the screen of the terminal device. For example, the whole outline of the circular area may be displayed, or part of the outline of the circular area may be displayed. In some other examples, the shape of the adsorbable area may also be preset by relevant skilled personnel, which is not specifically limited in the present disclosure.

Figure 3:
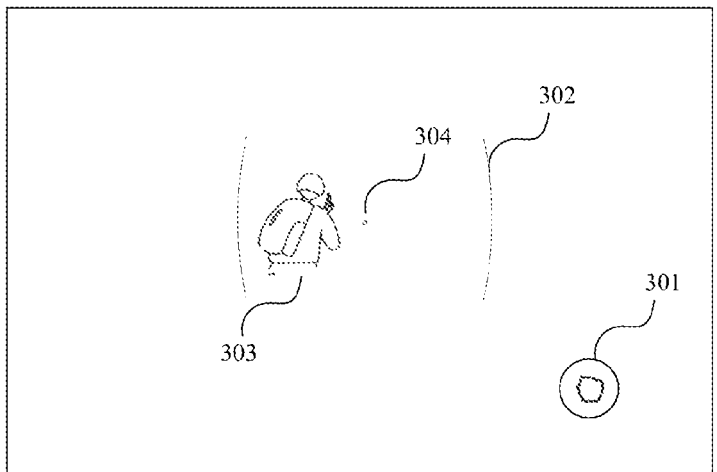
FIG. 3 schematically illustrates a schematic diagram of an adsorbable area according to an embodiment of the present disclosure.

Reference is made to FIG. 3, which illustrates a schematic diagram of an adsorbable area in a virtual scene. In FIG. 3, it includes a first short-range interaction skill control 301, an adsorbable area 302, a target virtual object 303, and a crosshair 304. Other skill controls are not shown in FIG. 3. For example, if the touch operation is the long press operation, the adsorbable area 302 may be displayed on the graphical user interface when the user performs a press operation on the first short-range interaction skill control 301 with a finger. The user may aim at, lock and absorb the target virtual object 303 that appears in the adsorbable area 302 while continuously pressing the first short-range interaction skill control 301. A central position of the adsorbable area 302 is the crosshair 304, and the crosshair 304 may be used to help the user aim at the target. The crosshair 304 may be displayed in a form of a small dot, a small circle, a small cross, or the like. In addition, the user may also set the display form of the crosshair 304 according to his/her own operating habit. When the user ends the long press operation, that is, when the user moves the finger away from the interactive interface, the target virtual object 303 can be automatically aimed at by the crosshair 304 immediately, and the interaction with the target virtual object 303 can be initiated. In this method, the user can be provided with a real-time preview of the adsorbable target range by triggering the first short-range interaction skill control, helping the user to determine the adsorbable area and perform subsequent operations on the target virtual object based on the orientation of the crosshair in the adsorbable area, thereby improving the user's operating experience.

In step S220, the target virtual object is locked in the virtual scene according to the orientation of the crosshair in the adsorbable area.

The orientation of the crosshair in the adsorbable area corresponds to an aiming direction of the first virtual object, that is, the orientation of the crosshair may be used to characterize the aiming direction of the first virtual object. The aiming direction is a shooting direction in which a virtual camera (equivalent to the user's eyes) of the virtual scene shoots the virtual scene to obtain the scene picture that is fully or partially presented in an aiming interface, and is configured to indicate a direction of the user's line of sight.

The user may automatically search for the target virtual object in the virtual scene based on the current orientation of the crosshair. When the target virtual object appears in the adsorbable area corresponding to the current orientation of the crosshair, that is, when the user finds the target virtual object in this area, an interface of the adsorbable area may be displayed with identification, such as changing the color of the crosshair, bolding the outline of the adsorbable area, or the like.

When no target virtual object is found in the adsorbable area corresponding to the current orientation of the crosshair, the user may perform a touch operation, such as a sliding operation, on the user interface, to adjust the orientation of the crosshair, and search for the target virtual object in the corresponding adsorbable area. For example, the adsorbable area corresponding to the current orientation of the crosshair is area A, and when the target virtual object is not found in area A, the user may change the orientation of the crosshair through the sliding operation acting on the screen of the terminal device. It should be noted that a scene picture in the adsorbable area corresponding to the orientation of the crosshair at any time is a scene picture obtained by shooting the virtual scene by the virtual camera at that time. Therefore, when the user changes the orientation of the crosshair by sliding to the left or right, which is actually controlled by the sliding operation is deflection of the virtual camera lens in the virtual scene to the right or left, that is, the orientation of the crosshair is adjusted by controlling the game scene in the current game screen to move in a direction opposite to a direction of the user's sliding operation. After the lens of the virtual camera is deflected, the adsorbable area corresponding to the current orientation of the crosshair becomes area B, and the target virtual object is searched for in area B. In the whole process, the orientation of the crosshair may be continuously adjusted until the target virtual object is found in the adsorbable area. Likewise, when the user finds the target virtual object in the adsorbable area, the interface of the adsorbable area may be displayed with identification, such as change of the color of the crosshair, bolding of the outline of the adsorbable area or the like, to prompt the user that the target virtual object has been found.

Figure 4:
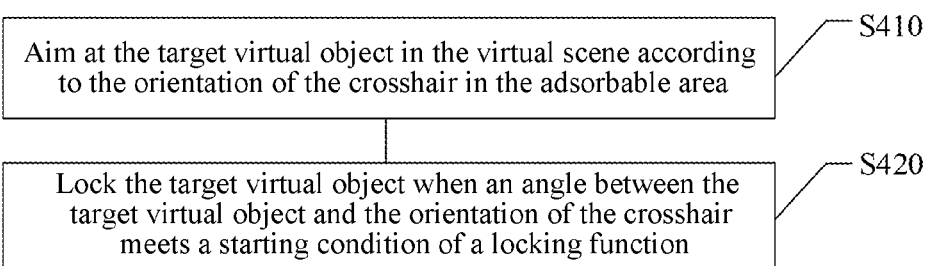
FIG. 4 schematically illustrates a flowchart of locking a virtual object according to an embodiment of the present disclosure.

Referring to FIG. 4, the target virtual object in the adsorbable area may be locked according to steps S410 and S420.

In step S410, the target virtual object is aimed at in the virtual scene according to the orientation of the crosshair in the adsorbable area.

In an example, when the target virtual object appears in the adsorbable area, the target virtual object may be located in the middle of the adsorbable area, or may be located on the left or right side of the adsorbable area. If the target virtual object is located in the middle of the adsorbable area, the position of the crosshair overlaps with the position of the target virtual object, indicating that the user or the first virtual object has already aimed at the target virtual object, the short-range interaction skill may be started upon the aiming, so as to perform the interaction with the target virtual object, such as hitting the virtual object. If the target virtual object is located on the left or right side of the adsorbable area, aiming assistance may be performed for the target virtual object according to the crosshair.

For example, if the target virtual object is located on the left or right side of the adsorbable area, the user may change the orientation of the crosshair through the sliding operation acting on the screen of the terminal device to aim the crosshair at the target virtual object. Specifically; the terminal device may detect the position of the target virtual object in real time, while detecting the direction of the sliding operation frame by frame. The direction of the sliding operation may be a sliding direction that brings the crosshair close to the target virtual object, or may be a sliding direction that brings the crosshair away from the target virtual object. When the direction of the sliding operation is detected frame by frame, sector detection may be performed along the direction of the sliding operation, and it may be determined whether the target virtual object is located in the corresponding sector area. If the target virtual object is located in the corresponding sector area, a lens deflection angle generated by the sliding operation may be increased or decreased according to the direction of the sliding operation. In this method, based on the user's sliding operation acting on the screen of the terminal device and the position of the target virtual object, incremental displacement may be provided for the aiming direction (i.e., the crosshair) of the user or the first virtual object, so that the user can aim at the target more easily.

Figure 5:
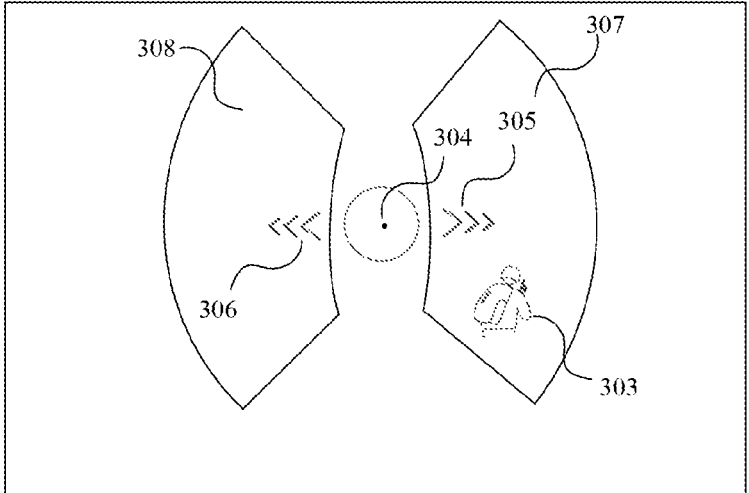
FIG. 5 schematically illustrates a schematic diagram of performing sector detection for a user's sliding operation in aiming assistance according to an embodiment of the present disclosure.

Referring to FIG. 5, a schematic diagram of performing sector detection for a user's sliding operation during aiming assistance is provided. It is schematically shown that the direction of the sliding operation may be a sliding direction 305 that brings a crosshair 304 close to a target virtual object 303, that is, a sliding direction that causes the current game scene to move to the left. The direction of the sliding operation may also be a sliding direction 306 that brings the crosshair 304 away from the target virtual object 303, that is, a sliding direction that causes the current game scene to move to the right. When the sliding direction 305 is detected frame by frame, sector detection may be performed along the sliding direction 305 and it may be determined whether the target virtual object 303 is located in a corresponding sector area 307, that is, whether the target appears in the game scene after the movement to the left. If the target virtual object 303 is located in the sector area 307, the lens deflection angle may be increased (i.e., the lens deflects at an accelerated rate) since the sliding operation brings the crosshair close to the target virtual object 303. When the sliding direction 306 is detected frame by frame, the sector detection may be performed along the sliding direction 306 and it may be determined whether the target virtual object 303 is located in a corresponding sector area 308. If the target virtual object 303 is not located in the sector area 308, the lens deflection angle may be decreased (i.e., the lens deflects at a decelerated rate) since the sliding operation brings the crosshair away from the target virtual object 303.

For example, sliding across 100 pixels may produce a lens deflection of 20 degrees under normal circumstances. In this example, when the sliding operation brings the crosshair close to the target virtual object, the lens deflection angle for sliding across 100 pixels may be increased to 40 degrees. It can be understood that if it only requires the lens deflection of 30 degrees to aim the crosshair at the target virtual object, the lens deflection angle for sliding across 100 pixels may be intelligently increased from 20 degrees to 30 degrees, rather than increasing from 20 degrees to 40 degrees. When the sliding operation brings the crosshair away from the target virtual object, the lens deflection angle for sliding across 100 pixels may be decreased to 10 degrees, and the user may perceive a small amount of friction when performing the sliding operation.

In this example, in addition to the use of the acceleration and deceleration of lens deflection to implement the aiming assistance, the user may also be provided with a small amount of lens adsorption. For example, when the sliding operation performed by the user does not directly point to the target virtual object, a small amount of deflection vector may be intelligently added to the lens, allowing the user to aim at the target more accurately.

In another example, in the process of aiming at the target virtual object, the target virtual object may move. For example, when it is detected that the target virtual object is moving in a direction away from the crosshair, the crosshair may be controlled to move in the same direction as the target virtual object moves. For example, when the target virtual object moves to the left of the crosshair and away from the crosshair, the crosshair may automatically move to the left, but the displacement of the crosshair will be reduced by a part. In this method, the crosshair may automatically follow the target virtual object to move a certain distance, which facilitates the user to aim at the moving virtual object, thereby reducing the difficulty in the user's operation.

In step S420, when an angle between the target virtual object and the orientation of the crosshair meets a starting condition of a locking function, the target virtual object is locked.

Specifically; the terminal device may detect the position of the target virtual object in real time. The current orientation of the crosshair is an angle-of-view direction of the first virtual object, a direction of a connection line between the first virtual object and the target virtual object is also a direction of a connection line between the crosshair and the target virtual object, and it may be determined whether the target virtual object meets the starting condition of the locking function based on an angle between the current orientation of the crosshair and the direction of the connection line. For example, when the angle meets a preset angle, the locking function may be automatically started to lock the target virtual object. For example, when the angle is less than or equal to 5 degrees, the target virtual object may be automatically locked.

When the target virtual object is locked, a charging progress control that is used for triggering an interaction skill may also be displayed on the graphical user interface. The charging, as used herein, may refer to a process of preparing the interaction skill or increasing the energy of the interaction skill so that the interaction skill can be used for attack in the gameplay: When the charging progress control shows that charging is completed, the interaction may be automatically initiated with respect to the target virtual object. The charging progress control may be displayed in a form of at least one of a progress bar, a number, and text. Preferably, when the user locks the target virtual object, a progress bar in a shape of a rectangular bar may be displayed above the target virtual object, so as to display a charging status of the melee skill in the form of a progress bar. When the progress bar is fully charged, the melee skill may be automatically triggered so that the first-person virtual object initiates an attack on the target virtual object. It should be noted that a display position, shape and color of the progress bar may be preset by relevant technical personnel according to actual needs, or may be set by the user according to his/her own operating habit. Through the progress bar, it is convenient to display a current state of the melee skill to the user, which can improve the user's experience.

Figure 6:
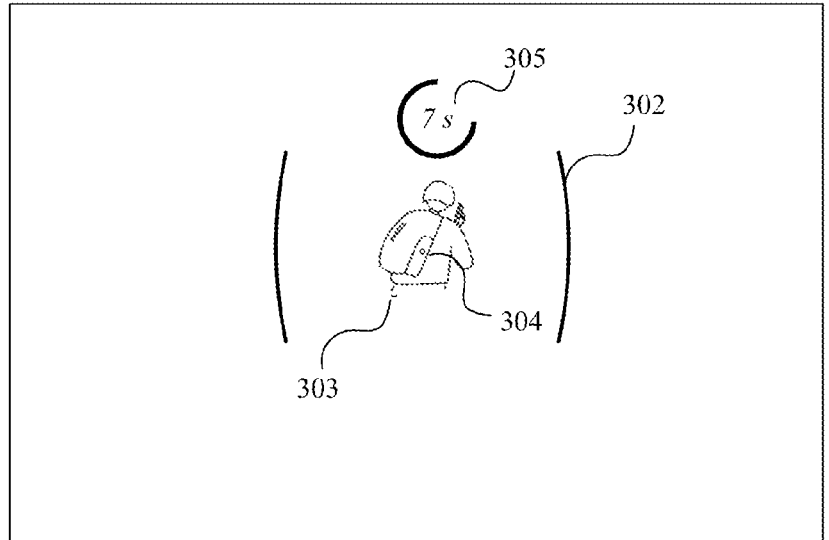
FIG. 6 schematically illustrates a schematic diagram of locking a target virtual object in an adsorbable area according to an embodiment of the present disclosure.

Reference is made to FIG. 6, which illustrates a schematic diagram of locking a target virtual object in an adsorbable area. When the target virtual object 303 is located in the adsorbable area 302, the interface of the adsorbable area 302 changes, that is, the outline of the adsorbable area 302 is bolded to indicate that an attack target appears in the adsorbable area 302 at this time. After the assistance aiming is performed with respect to the target virtual object 303 in the adsorbable area 302, when the angle between the target virtual object 303 and the orientation of the crosshair 304 meets the preset angle, the locking function may be automatically started to lock the target virtual object 303. When the target virtual object 303 is locked, a ring-shaped progress bar may also be displayed above the target virtual object 303, and a timing number in the middle of the ring may be used to indicate a charging stage of the melee skill. For example, the timing number currently displayed in the ring-shaped progress bar in FIG. 6 is 7 seconds. When the timing number is displayed as 10 seconds, the melee skill is fully charged, and at this time point, the attack may be automatically launched against the target virtual object 303.

In step S230, in response to the release operation acting on the first short-range interaction skill control, the locked target virtual object is adsorbed.

In some embodiments, if the user's touch operation acting on the first short-range interaction skill control is a press operation, the corresponding release operation may be an operation of removing the finger from the interactive interface, that is, an operation of lifting the finger. It should be noted that the touch operation and the release operation in this example are continuous operations that can last for a certain period of time.

After the target virtual object is aimed at and locked, the terminal device may detect the current positions of the first virtual object and the target virtual object in real time, and determine a distance between the first virtual object and the target virtual object. In a case that the distance between the first virtual object and the target virtual object is relatively far, if the first virtual object directly launches a short-range attack on the target virtual object, it cannot hit the target virtual object. Therefore, in this example, a rushing effect may be provided for the melee skill to address the distance issue in the process of the short-range interaction.

For example, after the target virtual object is locked, the user can end the press operation, that is, remove the finger from the interactive interface. In response to the operation of lifting up the finger by the user, the first virtual object may be controlled to quickly move toward the locked target virtual object to adsorb the target virtual object if the distance between the first virtual object and the target virtual object is greater than a first distance.

Referring to FIG. 7, the locked target virtual object may be adsorbed according to steps S710 and S720.

In step S710, when it is detected that the distance between the first virtual object and the target virtual object is greater than the first distance, ray detection is performed in a direction of the current orientation of the crosshair.

When the distance between the first virtual object and the target virtual object is greater than the first distance, in order to accurately hit the target virtual object, the first virtual object may automatically move quickly toward the target virtual object by a certain distance to adsorb the target virtual object and attack the target virtual object. In the process of the first virtual object moving toward the target virtual object, the ray detection may be performed in the direction of the current orientation of the crosshair, that is, the ray detection may be performed along the current orientation of the crosshair. For example, a ray may be emitted from the current orientation of the crosshair to detect whether there is a target ahead.

In step S720, when a virtual object that is first detected by the ray in the virtual scene is the target virtual object, the first virtual object is controlled to move toward the locked target virtual object.

During the movement of the first virtual object toward the target virtual object, a ray may be emitted from the current orientation of the crosshair to continuously detect whether there is the target ahead. When the virtual object that is first detected by the ray in front is still the target virtual object, it may continue to control the first virtual object to quickly approach the target virtual object. For example, the first virtual object may move toward the target virtual object at a first speed, and the first speed is greater than a moving speed of the first virtual object when the melee skill control is not triggered. The first virtual object may also move toward the target virtual object at a first acceleration, or the first virtual object may also quickly approach the target virtual object in a manner of teleportation.

When the virtual object first detected by the ray in the virtual scene is not the target virtual object, that is, during the movement towards the target virtual object, another virtual object appears between the first virtual object and the target virtual object, the user may decide whether to adjust the adsorption object. For example, the first virtual object may sprint towards the other virtual object and perform a hitting action, and at this time, the adsorption object changes from the target virtual object to the other virtual object appearing between the first virtual object and the target virtual object. In this example, from the detection through the ray that continuously directs forward, it may be decided whether to adjust the adsorption object based on the real-time ray detection result, thereby avoiding the situation that the target in the front cannot be adsorbed in a reasonable manner due to the change or entanglement in the target position, which makes the entire process smarter and more natural.

In another exemplary embodiment, after the user aims at the target virtual object, the user may not lock the target virtual object, but directly initiate the interaction with the target virtual object. And, when the target virtual object is determined to be the attack target, and the distance between the first virtual object and the target virtual object is less than or equal to a second distance, that is, the distance between the first virtual object and the target virtual object is relatively close, the first virtual object can hit the target virtual object without sprinting forward. In this case, the first virtual object may not adsorb the target virtual object, but directly initiate the interaction with the target virtual object.

In step S240, the collision detection is performed with respect to the adsorbed target virtual object, and the interaction with the target virtual object is initiated according to the result of the detection.

After the user determines that the target virtual object is the adsorbed object, the user may initiate a sprint towards the target virtual object. The first virtual object is equipped with a collision detection box, and the collision detection box may be used for the collision detection for the first virtual object and the target virtual object. In the process of the sprint, continuous collision detection may be performed for the target virtual object and the first virtual object by using the collision detection box, and based on the real-time detection result, it is determined whether to trigger the collision in advance, that is, whether to release in advance the short-range attack skill, such as performing a hit action, performing a slashing action, or the like.

Figure 8:
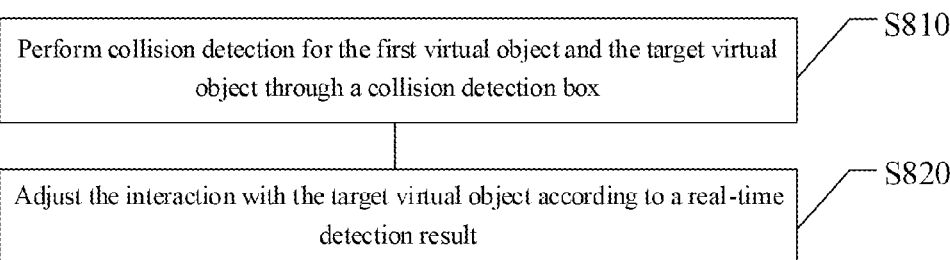
FIG. 8 schematically illustrates a flowchart of interacting with a target virtual object according to an embodiment of the present disclosure.

Referring to FIG. 8, the interaction with the target virtual object may be initiated according to steps S810 and S820.

In step S810, collision detection is performed for the first virtual object and the target virtual object through the collision detection box.

In an example, the collision detection box may be a bounding box, the bounding box refers to a relatively simple and closed space in which combination of objects are completely accommodated, and the bounding box is generally used to speed up a certain detection process. For example, in order to detect an overlapping relationship between objects, rough detection may be performed first through bounding boxes for the objects, and when two bounding boxes do not overlap, the corresponding two original objects must not intersect. For example, a bounding box may be established for each skeletal model, that is, for each virtual object, and whether a collision occurs between the virtual objects may be determined by detecting whether there is overlapping between the bounding boxes. The bounding box may be an Axis-Aligned Bounding Box (AABB), an Oriented Bounding Box (OBB), etc. For example, static detection may be performed for the AABB boxes to detect whether two static bounding boxes intersect, and the result of the detection may be intersection or non-intersection. For the OBB box, a size and direction of the box may be determined based on a skeletal model of the virtual object. Specifically, an axis of the OBB may be determined based on the distribution of skeletal nodes in space. Whether the first virtual object collides with another virtual object is determined through the collision detection between the OBB boxes. In some other examples, the space may also be segmented through spatial indexes so that the collision detection is performed for the virtual objects in the space, and through this method, unnecessary detection may be filtered out, thereby improving the efficiency of the collision detection.

In step S820, the interaction with the target virtual object is adjusted according to a real-time detection result.

During the sprint of the first virtual object, if it is detected that a bounding box of the first virtual object overlaps with a bounding box of another virtual object, or when it is detected in advance that the bounding box of the first virtual object overlaps with a bounding box of the target virtual object because the distance between the first virtual object and the target virtual object become smaller due to the change in the position of the target virtual object, the user may decide whether to trigger the collision in advance based on the result of the detection. For example, it may be the situation that the first virtual object encounters another virtual object while sprinting towards the target virtual object, and when it is detected that the bounding box of the first virtual object overlaps with the bounding box of the other virtual object, the collision needs to be triggered ahead of time, to hit the virtual object. It may also be the situation that the target virtual object has been moving towards the first virtual object while the first virtual object is sprinting towards the target virtual object, and when it is detected that the bounding boxes of the first virtual object and the target virtual object overlap, the collision needs to be triggered ahead of time, to hit the target virtual object. It should be understood that the first virtual object will continuously move quickly toward the target virtual object by taking a sprinting action during the sprinting process, and when the user decides to trigger the collision in advance, the user needs to stop the sprinting immediately and switch from the sprinting action to a hitting action.

In the embodiments of the present disclosure, there is provided a new melee operation manner which can support aiming at an enemy; locking the enemy; and adsorbing the enemy in a short range by the player in the process of the short-range interaction, which not only diversifies the forms of the short-range interaction, but also optimizes the user's operating experience in using the short-range interaction skill. This melee operation manner is suitable for a small melee attack range, such as a melee attack range with a small short-range interaction radius or a melee attack range with a small short-range interaction angle. The interaction angle refers to an angle between a direction of a connection line between the first virtual object and the target virtual object and the current orientation of the first virtual object. When the short-range interaction radius is small, the left and right movement of the first virtual object will also cause a large change in the melee interaction angle, making it difficult to capture the target, and thus it needs to provide the user with an aiming function.

In another exemplary embodiment, when at least one virtual object appears in a second target interaction area, the user may perform a touch operation on a second short-range interaction skill control displayed on the screen of the terminal device to control the first virtual object to initiate the interaction against the target virtual object. The touch operation may be a single click operation, a double click operation, etc. The second target interaction area may be a short-range interaction area determined by a second interaction radius which is larger than the first interaction radius. When the distance between the first virtual object and the target virtual object belongs to the short-range interaction range but is relatively far, the melee attack has a relatively large attack range or high requirement in immediacy, and there is no need to perform aiming when initiating the interaction with the target virtual object, which is of low difficulty in operation.

For example, in response to the user's touch operation acting on the second short-range interaction skill control, the terminal device may cause the first virtual object to automatically search for and lock an optimal target in the second target interaction area, sprint toward the optimal target, and hit the target. The optimal target may be a virtual object that has the shortest distance to the first virtual object, or a virtual object that has the smallest interaction angle with respect to the first virtual object, or a virtual object that satisfies both the shortest distance and the smallest interaction angle. It should be noted that the first virtual object can actively track the target while the first virtual object is sprinting towards the target, further reducing the difficulty in operation.

Figure 9:
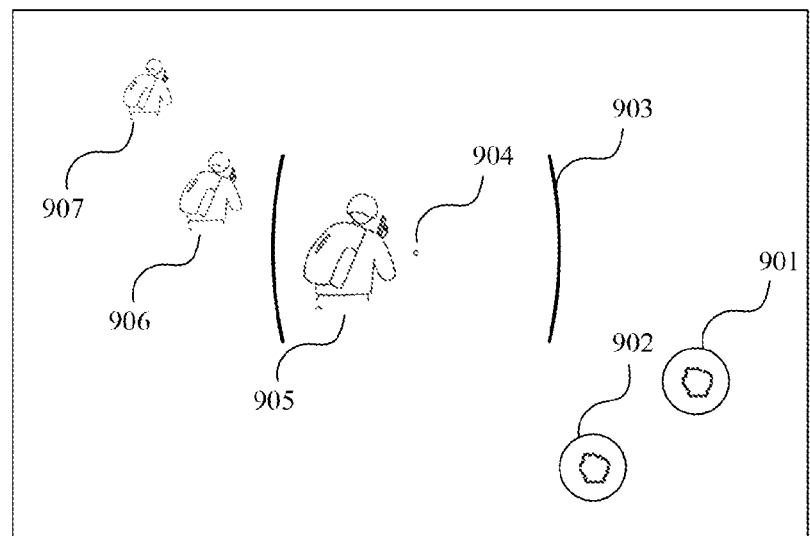
FIG. 9 schematically illustrates a graphical user interface according to an embodiment of the present disclosure.

In a specific exemplary implementation, reference is made to FIG. 9, which illustrates a schematic diagram of a graphical user interface. The interface may include a game scene and virtual objects located in the game scene. The game scene is not shown in FIG. 9, and the player may control a first virtual object to move in the game scene. The interface of FIG. 9 shows a variety of skill controls, and the controls are displayed on top of the game scene.

For example, the first target interaction area in which the short-range interaction can be carried out may be an attack range determined by an interaction radius with a physical distance of 5 meters, and the second target interaction area may be an attack range determined by an interaction radius with a physical distance of 10 meters. When the virtual object appears in different target interaction areas, the player may select different melee interaction skills. For example, when the virtual object appears in the first target interaction area, the player may select a first melee interaction skill and perform the interaction through a first short-range interaction skill control. When the virtual object appears in the second target interaction area, the player may select a second melee interaction skill and perform the interaction through a second short-range interaction skill control. When the virtual object appears in an area outside the second target interaction area, such as an area with an interaction radius greater than 10 meters, the player may select a long-range battle interaction skill and perform the interaction through a long-range interaction skill control.

When the virtual object appears in the first target interaction area, the player may use the first short-range interaction skill to aim at the virtual object and then launch an attack. For example, the player may perform a long press operation on a first short-range interaction skill control 901. When the player presses and holds the skill control, an adsorbable area 903 may be displayed in the graphical user interface. While the player continuously presses and holds the skill control, the aiming assistance may be performed with respect to the virtual object 905 through the crosshair 904, so that the player can aim at the target more easily. After determining the virtual object 905 as the attack target, the player may lock the attack target, or may directly attack the attack target without locking it. If the attack target is locked, a progress bar may be displayed to show a skill charging state. When the progress bar is fully filled, an attack skill will be automatically started, and the attack will be launched against the target. If the attack target is not locked, the player may end the long press operation, for example, by lifting the finger, and the attack can be launched against the target.

Before the attack is launched against the virtual object 905, a distance between the first virtual object and the virtual object 905 may also be detected, and the short-range interaction skill may be provided with a rushing effect based on a magnitude of the distance between the first virtual object and the virtual object 905. That is, the first virtual object may sprint towards the virtual object 905, avoiding failure to hit the target due to the distance.

When the virtual object appears in the second target interaction area, the player may launch an attack against the optimal target in the second target interaction area using the second short-range interaction skill. For example, the player can perform a touch operation acting on a second short-range interaction skill control 902, and when the player clicks on this skill control, the first virtual object may automatically search for and lock the optimal target in the second target interaction area and launch the attack against it. If a virtual object 906 and a virtual object 907 are located in the second target interaction area, it can be seen that the virtual object 906 is closer to the first virtual object than the virtual object 907, and an angle between a direction of a connection line between the virtual object 906 and the first virtual object and the current orientation of the first virtual object is smaller. Therefore, the virtual object 906 may be determined as the optimal target at the current moment. It should be noted that the second short-range interaction skill is a melee ability that takes effect immediately upon press, and can come with an enemy searching function without additional aiming, which reduces the difficulty in the player's operation and improves the player's operation experience.

In the virtual object interaction method provided by the embodiments of the present disclosure, the adsorbable area is displayed on the graphical user interface in response to the touch operation acting on the first short-range interaction skill control: the target virtual object is locked in the virtual scene according to the orientation of the crosshair in the adsorbable area: the locked target virtual object is adsorbed in response to the release operation acting on the first short-range interaction skill control; and the collision detection is performed for the adsorbed target virtual object, and the interaction with the target virtual object is initiated according to the result of the detection. In one aspect, when a user controls a virtual object to initiate a short-range interaction, aiming, locking and adsorbing the target virtual object are supported, which provides a new short-range interaction manner. In another aspect, during the short-range interaction process, a target hit rate can be improved by aiming, locking and adsorbing the target virtual object, thereby improving the user's operating experience. In still another aspect, the adsorption target can be determined based on the real-time collision detection, further optimizing the user's operating experience in using the short-range interaction skill.

It should be noted that although various steps of the method of the present disclosure are described in a particular order in the figures, it is not required or implied that these steps must be performed in the particular order, or all the steps shown must be performed to achieve the desired result. Additionally or alternatively, certain steps may be omitted, multiple steps may be combined into one step, one step may be decomposed into multiple steps, and/or the like.

Figure 10:
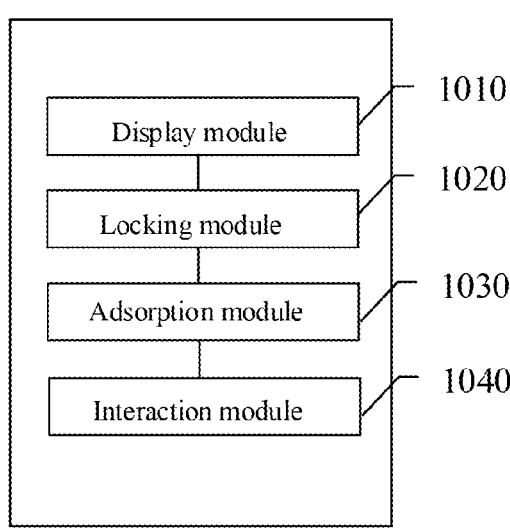
FIG. 10 schematically illustrates a block diagram of a virtual object interaction device according to an embodiment of the present disclosure.

Furthermore, there is also provided a virtual object interaction device in the embodiments of the present disclosure. Referring to FIG. 10, a virtual object interaction device 1000 may include a display module 1010, a locking module 1020, an adsorption module 1030 and an interaction module 1040.

The display module 1010 is configured to display an adsorbable area on the graphical user interface in response to a touch operation acting on a first short-range interaction skill control.

The locking module 1020 is configured to lock a target virtual object in the virtual scene according to an orientation of a crosshair in the adsorbable area.

The adsorption module 1030 is configured to adsorb the locked target virtual object in response to a release operation acting on the first short-range interaction skill control.

The interaction module 1040 is configured to perform collision detection for the adsorbed target virtual object, and initiate interaction with the target virtual object according to a result of the detection.

In some embodiments, the locking module 1020 includes:

an aiming unit, configured to aim at the target virtual object in the virtual scene according to the orientation of the crosshair in the adsorbable area; and a locking unit, configured to lock the target virtual object when an angle between the target virtual object and the orientation of the crosshair meets a starting condition of a locking function.

In some embodiments, the aiming unit includes:

a first aiming assistance subunit, configured to control the crosshair to deflect in acceleration when a touch operation that brings the crosshair close to the target virtual object is detected; and a second aiming assistance subunit, configured to control the crosshair to deflect in deceleration when a touch operation that brings the crosshair away from the target virtual object is detected.

In some embodiments, the aiming unit further includes:

a third aiming assistance subunit, configured to control the crosshair to move in a same direction as the target virtual object moves and to aim at the target virtual object when it is detected that the target virtual object moves in a direction away from the crosshair.

In some embodiments, the adsorption module 1030 includes:

an adsorption unit, configured to, in response to the release operation acting on the first short-range interaction skill control, control a first virtual object to move toward the locked target virtual object when it is detected that a distance between the first virtual object and the target virtual object is greater than a first distance.

In some embodiments, the adsorption unit includes:

a ray detection subunit, configured to perform ray detection in a direction of a current orientation of the crosshair when it is detected that the distance between the first virtual object and the target virtual object is greater than the first distance; and an adsorption subunit, configured to control the first virtual object to move toward the locked target virtual object when a virtual object that is first detected by the ray detection in the virtual scene is the target virtual object.

In some embodiments, the locking unit includes:

a progress display subunit, configured to display, on the graphical user interface, a charging progress control that is for triggering an interaction skill; and an automatic interaction subunit, configured to automatically initiate the interaction with the target virtual object when the charging progress control shows that charging is completed.

In some embodiments, the first virtual object is equipped with a collision detection box, and the interaction module 1030 includes:

a collision detection unit, configured to perform the collision detection for the first virtual object and the target virtual object through the collision detection box; and an interaction adjustment unit, configured to adjust the interaction with the target virtual object according to a real-time detection result.

In some embodiments, the virtual object interaction device 1000 further includes:

a target searching module, configured to automatically search for the target virtual object in the virtual scene according to the orientation of the crosshair in the adsorbable area; and a differentiated display module, configured to display an interface of the adsorbable area with identification when the target virtual object appears in the adsorbable area.

In some embodiments, the virtual object interaction device 1000 further includes:

an automatic locking module, configured to automatically search for and lock the target virtual object in the virtual scene in response to a trigger operation acting on a second short-range interaction skill control; and a target adsorption module, configured to adsorb the locked target virtual object to initiate the interaction with the target virtual object.

Specific details of the modules in the above virtual object interaction device have been described in detail in the corresponding virtual object interaction method, which will not be repeated here.

The modules in the above device may be a general-purpose processor, including a central processing unit, a network processor, etc.: or may also be a digital signal processor, an application-specific integrated circuit, a field programmable gate array or other programmable logic devices, a discrete gate or a transistor logic device, or a discrete hardware component. The modules may also be implemented in the form of software, firmware, etc. The processors in the above device may be separate processors or may be integrated together.

The embodiments of the present disclosure also provide a computer-readable storage medium having stored thereon a program product capable of implementing the above method in the specification. In some implementations, aspects of the present disclosure may also be implemented in the form of a program product including program codes, and when the program product runs on an electronic device, the program codes are configured to cause the electronic device to perform steps of the virtual object interaction method according to various embodiments of the present disclosure described above, including, for example:

in response to a touch operation acting on a first short-range interaction skill control, displaying an adsorbable area on the graphical user interface;

locking a target virtual object in the virtual scene according to an orientation of a crosshair in the adsorbable area;

in response to a release operation acting on the first short-range interaction skill control, adsorbing the locked target virtual object; and performing collision detection for the adsorbed target virtual object, and initiating interaction with the target virtual object according to a result of the detection.

In some embodiments, locking the target virtual object in the virtual scene according to the orientation of the crosshair in the adsorbable area includes:

aiming at the target virtual object in the virtual scene according to the orientation of the crosshair in the adsorbable area; and locking the target virtual object when an angle between the target virtual object and the orientation of the crosshair meets a starting condition of a locking function.

In some embodiments, aiming at the target virtual object in the virtual scene according to the orientation of the crosshair in the adsorbable area includes:

controlling the crosshair to deflect in acceleration when a touch operation that brings the crosshair close to the target virtual object is detected; and controlling the crosshair to deflect in deceleration when a touch operation that brings the crosshair away from the target virtual object is detected.

In some embodiments, aiming at the target virtual object in the virtual scene according to the orientation of the crosshair in the adsorbable area further includes:

when it is detected that the target virtual object moves in a direction away from the crosshair, controlling the crosshair to move in a same direction as the target virtual object move and to aim at the target virtual object.

In some embodiments, adsorbing the locked target virtual object in response to the release operation acting on the first short-range interaction skill control includes:

in response to the release operation acting on the first short-range interaction skill control, when it is detected that a distance between a first virtual object and the target virtual object is greater than a first distance, controlling the first virtual object to move toward the locked target virtual object.

In some embodiments, when it is detected that the distance between the first virtual object and the target virtual object is greater than the first distance, controlling the first virtual object to move toward the locked target virtual object includes:

performing ray detection in a direction of a current orientation of the crosshair when it is detected that the distance between the first virtual object and the target virtual object is greater than the first distance; and controlling the first virtual object to move toward the locked target virtual object when a virtual object that is first detected by the ray detection in the virtual scene is the target virtual object.

In some embodiments, when locking the target virtual object in the virtual scene according to the orientation of the crosshair in the adsorbable area, the method further includes:

displaying, on the graphical user interface, a charging progress control that is used for triggering an interaction skill; and automatically initiating the interaction with the target virtual object when the charging progress control shows that charging is completed.

In some embodiments, the first virtual object is equipped with a collision detection box, and performing the collision detection for the adsorbed target virtual object and initiating the interaction with the target virtual object according to the result of the detection includes:

performing the collision detection for the first virtual object and the target virtual object through the collision detection box; and adjusting the interaction with the target virtual object according to a real-time detection result.

In some embodiments, the method further includes:

automatically searching for the target virtual object in the virtual scene according to the orientation of the crosshair in the adsorbable area; and displaying an interface of the adsorbable area with identification when the target virtual object appears in the adsorbable area.

In some embodiments, the method further includes:

automatically searching for and locking the target virtual object in the virtual scene in response to a trigger operation acting on a second short-range interaction skill control; and adsorbing the locked target virtual object to initiate the interaction with the target virtual object.

With the above scheme, in an aspect, when the user controls the virtual object to initiate the short-range interaction, aiming, locking and adsorbing the target virtual object are supported, which provides a new short-range interaction manner. In another aspect, during the short-range interaction process, a target hit rate can be improved by aiming, locking and adsorbing the target virtual object, thereby improving the user's operating experience. In still another aspect, the adsorption target can be determined based on the real-time collision detection, further optimizing the user's operating experience in using the short-range interaction skill.

The program product may take the form of a portable Compact Disc Read-Only Memory (CD-ROM) and include program codes, and may be run on an electronic device, such as a personal computer. However, the program product of the present disclosure is not limited thereto. The readable storage medium herein may be any tangible medium containing or storing a program, and the program may be used by an instruction execution system, apparatus, or device, or the program may be used in combination with the instruction execution system, apparatus, or device.

The program product may take the form of any combination of one or more readable mediums. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (a non-exhaustive list) of readable storage media include: electrical connection with one or more wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The computer-readable signal medium may include a data signal propagated in a baseband or as part of a carrier wave, which carries readable program codes. Such a propagated data signal may have various forms, including but not limited to electromagnetic signals, optical signals, or any suitable combination of the foregoing. The readable signal medium may also be any readable medium other than a readable storage medium, and the readable medium may send, propagate, or transmit a program that is used by an instruction execution system, apparatus, or device, or that is used in combination with the instruction execution system, apparatus, or device.

The program codes embodied on the readable medium may be transmitted using any appropriate medium, including but not limited to a wireless or wired medium, an optical fiber, RF, or any suitable combination of the foregoing.

The program codes used for performing the operations of the present disclosure may be written in any combination of one or more programming languages, including object-oriented programming languages, such as Java and C++, and conventional procedural programming language, such as "C" or a similar programming language. The program codes may be executed entirely on the user computing device, may be executed partly on the user device, may be executed as an independent software package, may be executed partly on the user computing device and partly on a remote computing device, or may be executed entirely on the remote computing device or server. In the case of a remote computing device, the remote computing device may be connected to the user computing device through any kind of network, including a local area network (LAN) or a wide area network (WAN), or the remote computing device may be connected to an external computing device, for example, by the Internet provided by the Internet service providers.

The embodiments of the present disclosure also provide an electronic device capable of implementing the above method. An electronic device 1100 according to the embodiments of the present disclosure is described below with reference to FIG. 11. The electronic device 1100 shown in FIG. 11 is only an example and should not bring any limitations to the functions and scope of use of embodiments of the present disclosure.

Figure 11:
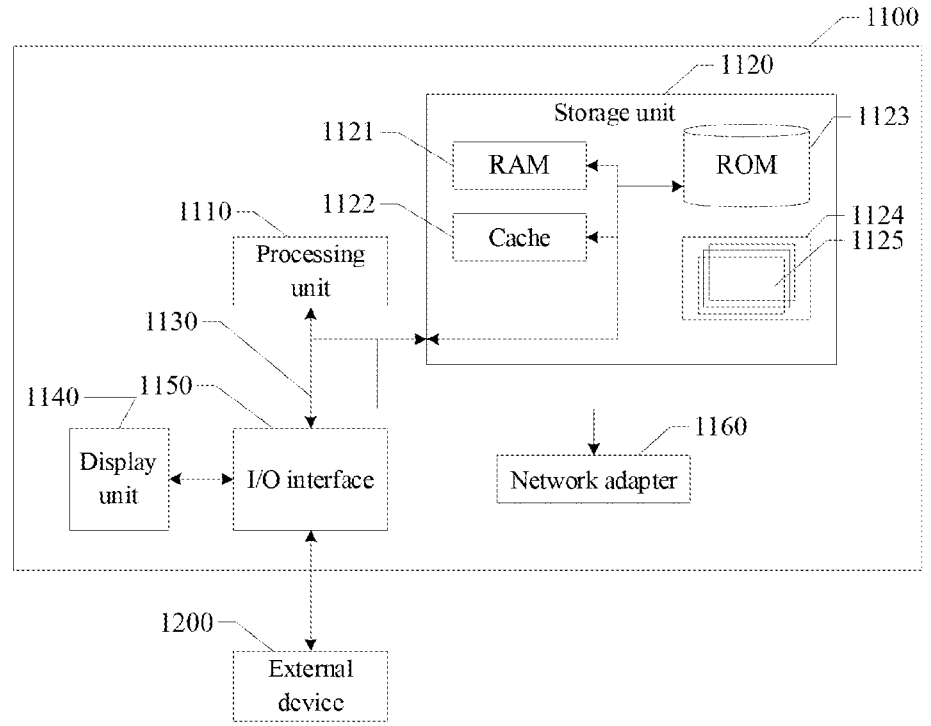
FIG. 11 illustrates a schematic structural diagram of an electronic device suitable for implementing an embodiment of the present disclosure.

As shown in FIG. 11, the electronic device 1100 may take the form of a general-purpose computing device. Components of the electronic device 1100 may include, but are not limited to: at least one processing unit 1110, at least one storage unit 1120, a bus 1130 connecting different system components (including the storage unit 1120 and the processing unit 1110), and a display unit 1140.

The storage unit 1120 stores program codes which can be executed by the processing unit 1110 to cause the processing unit 1110 to perform the steps of the virtual object interaction method according to various embodiments of the present disclosure described above. For example, the processing unit 1110 may perform any one or more of the method steps in FIG. 2, FIG. 4, FIG. 7, and FIG. 8. For another example:

in response to a touch operation acting on a first short-range interaction skill control, displaying an adsorbable area on the graphical user interface;

locking a target virtual object in the virtual scene according to an orientation of a crosshair in the adsorbable area;

in response to a release operation acting on the first short-range interaction skill control, the locked target virtual object is adsorbed; and performing collision detection for the adsorbed target virtual object, and initiating interaction with the target virtual object according to a result of the detection.

In some embodiments, locking the target virtual object in the virtual scene according to the orientation of the crosshair in the adsorbable area includes:

aiming at the target virtual object in the virtual scene according to the orientation of the crosshair in the adsorbable area; and locking the target virtual object when an angle between the target virtual object and the orientation of the crosshair meets a starting condition of a locking function.

In some embodiments, aiming at the target virtual object in the virtual scene according to the orientation of the crosshair in the adsorbable area includes:

controlling the crosshair to deflect in acceleration when a touch operation that brings the crosshair close to the target virtual object is detected; and controlling the crosshair to deflect in deceleration when a touch operation that brings the crosshair away from the target virtual object is detected.

In some embodiments, aiming at the target virtual object in the virtual scene according to the orientation of the crosshair in the adsorbable area further includes:

controlling the crosshair to move in a same direction as the target virtual object move and to aim at the target virtual object when it is detected that the target virtual object moves in a direction away from the crosshair.

In some embodiments, adsorbing the locked target virtual object in response to the release operation acting on the first short-range interaction skill control includes:

in response to the release operation acting on the first short-range interaction skill control, when it is detected that a distance between a first virtual object and the target virtual object is greater than a first distance, controlling the first virtual object to move toward the locked target virtual object.

In some embodiments, when it is detected that the distance between the first virtual object and the target virtual object is greater than the first distance, controlling the first virtual object to move toward the locked target virtual object includes:

performing ray detection in a direction of a current orientation of the crosshair when it is detected that the distance between the first virtual object and the target virtual object is greater than the first distance; and controlling the first virtual object to move toward the locked target virtual object when a virtual object that is first detected by the ray detection in the virtual scene is the target virtual object.

In some embodiments, when locking the target virtual object in the virtual scene according to the orientation of the crosshair in the adsorbable area, the method further includes:

displaying, on the graphical user interface, a charging progress control used for triggering an interaction skill; and automatically initiating the interaction with the target virtual object when the charging progress control shows that charging is completed.

In some embodiments, the first virtual object is equipped with a collision detection box, and performing the collision detection for the adsorbed target virtual object and initiating the interaction with the target virtual object according to the result of the detection includes:

performing the collision detection for the first virtual object and the target virtual object through the collision detection box; and adjusting the interaction with the target virtual object according to a real-time detection result.

In some embodiments, the method further includes:

automatically searching for the target virtual object in the virtual scene according to the orientation of the crosshair in the adsorbable area; and displaying an interface of the adsorbable area with identification when the target virtual object appears in the adsorbable area.

In some embodiments, the method further includes:

automatically searching for and locking the target virtual object in the virtual scene in response to a trigger operation acting on a second short-range interaction skill control; and adsorbing the locked target virtual object to initiate the interaction with the target virtual object.

With the above scheme, in an aspect, when the user controls the virtual object to initiate the short-range interaction, aiming, locking and adsorbing the target virtual object are supported, which provides a new short-range interaction manner. In another aspect, during the short-range interaction process, a target hit rate can be improved by aiming, locking and adsorbing the target virtual object, thereby improving the user's operating experience. In still another aspect, the adsorption target can be determined based on the real-time collision detection, further optimizing the user's operating experience in using the short-range interaction skill.

The storage unit 1120 may include a readable medium in the form of a volatile storage unit, such as a random access storage unit (RAM) 1121 and/or a cache storage unit 1122, and may further include a read-only storage unit (ROM) 1123.

The storage unit 1120 may further include a program/utility tool 1124 having a set (at least one) of program modules 1125. Such program modules 1125 include, but are not limited to, an operating system, one or more application programs, other program modules, and program data. Each or some combination of these examples may include an implementation of a network environment.

The bus 1130 may be one or more of several types of bus structures, including a memory unit bus or a memory unit controller, a peripheral bus, a graphics acceleration port, a processing unit, or a local area bus using any bus structure in a variety of bus structures. The electronic device 1100 may also communicate with one or more external devices 1200 (such as a keyboard, a pointing device, a Bluetooth device, etc.), and may also communicate with one or more devices that enable a user to interact with the electronic device 1100, and/or may also communicate with any device (such as a router, a modem) that can enables the electronic device 1100 to communicate with one or more other computing devices. Such communication may be performed through an input/output (I/O) interface 1150. Moreover, the electronic device 1100 may also communicate with one or more networks (such as a local area network (LAN), a wide area network (WAN), and/or a public network, such as the Internet) through the network adapter 1160. As shown in the figure, the network adapter 1160 communicates with other modules of the electronic device 1100 through the bus 1130. It should be understood that although not shown in the figure, other hardware and/or software modules may be used in conjunction with the electronic device 1100, including but not limited to: microcode, device drivers, redundant processing units, external disk drive arrays, RAID systems, tape drives and data backup storage systems.

Through the description of the foregoing embodiments, those skilled in the art can readily understand that the exemplary embodiments described herein may be implemented by software, or by software in combination with necessary hardware. Therefore, the technical solutions according to the embodiments of the present disclosure may be embodied in the form of a software product, which may be stored in a non-volatile storage medium (which may be a CD-ROM, a U disk, a mobile hard disk, etc.) or on a network, and the software product may include instructions to cause a computing device (which may be a personal computer, a server, a terminal device, or a network device, etc.) to execute the method according to exemplary embodiments of the present disclosure.

In addition, the drawings are merely schematic illustrations of processes included in the methods according to exemplary embodiments of the present disclosure, and are not intended to limit the present disclosure. It is easy to understand that the processes shown in the drawings do not indicate or limit the chronological order of these processes. In addition, it is also easy to understand that these processes may be performed synchronously or asynchronously, for example, in multiple modules.

It should be noted that although several modules or units of the devices for performing actions are mentioned in the above detailed description, such division of modules or units is not mandatory. In fact, features and functions of two or more of the modules or units described above may be embodied in one module or unit in accordance with embodiments of the present disclosure. Conversely, the features and functions of one module or unit described above may be further divided to be embodied by multiple modules or units.

It should be understood that the present disclosure is not limited to the precise structure that has been described above and shown in the drawings, and various modifications and changes may be made without departing from the scope of the present disclosure. The scope of the disclosure is only defined by the appended claims.

What is claimed is:

1. A virtual object interaction method, comprising:
displaying an adsorbable area on a graphical user interface in response to a touch operation acting on a first short-range interaction skill control, wherein the graphical user interface is provided by a terminal device and comprises a virtual scene and at least one short-range interaction skill control;
locking a target virtual object in the virtual scene according to an orientation of a crosshair in the adsorbable area;
adsorbing the target virtual object in response to a release operation acting on the first short-range interaction skill control; and
performing collision detection for the target virtual object, and initiating interaction with the target virtual object according to a result of the detection,
wherein adsorbing the target virtual object in response to the release operation acting on the first short-range interaction skill control comprises:
in response to the release operation acting on the first short-range interaction skill control, and in response to detecting that a distance between a first virtual object and the target virtual object is greater than a first distance, performing ray detection in a direction of a current orientation of the crosshair; and
in response to determining that a virtual object that is first detected by the ray detection in the virtual scene is the target virtual object, controlling the first virtual object to move toward the target virtual object.

2. The virtual object interaction method according to claim 1, wherein locking the target virtual object in the virtual scene according to the orientation of the crosshair in the adsorbable area comprises:
aiming at the target virtual object in the virtual scene according to the orientation of the crosshair in the adsorbable area; and
locking the target virtual object in response to determining that an angle between the target virtual object and the orientation of the crosshair meets a starting condition of a locking function.

3. The virtual object interaction method according to claim 2, wherein aiming at the target virtual object in the virtual scene according to the orientation of the crosshair in the adsorbable area comprises:
controlling the crosshair to deflect in acceleration in response to detecting a touch operation that brings the crosshair close to the target virtual object; and
controlling the crosshair to deflect in deceleration in response to detecting a touch operation that brings the crosshair away from the target virtual object.

4. The virtual object interaction method according to claim 2, wherein aiming at the target virtual object in the virtual scene according to the orientation of the crosshair in the adsorbable area further comprises:
in response to detecting that the target virtual object moves in a direction away from the crosshair, controlling the crosshair to move in a same direction as the target virtual object moves and to aim at the target virtual object.

5. The virtual object interaction method according to claim 2, wherein the method further comprises:
in response to locking the target virtual object in the virtual scene according to the orientation of the crosshair in the adsorbable area, displaying, on the graphical user interface, a charging progress control used for triggering an interaction skill; and
automatically initiating the interaction with the target virtual object when the charging progress control indicates that charging is completed.

6. The virtual object interaction method according to claim 1, wherein the first virtual object is equipped with a collision detection box, and wherein performing the collision detection for the target virtual object and initiating the interaction with the target virtual object according to the result of the detection comprises:
performing the collision detection for the first virtual object and the target virtual object through the collision detection box; and
adjusting the interaction with the target virtual object according to a real-time detection result.

7. The virtual object interaction method according to claim 1, further comprising:
automatically searching for the target virtual object in the virtual scene according to the orientation of the crosshair in the adsorbable area; and
displaying an interface of the adsorbable area with identification in response to determining that the target virtual object appears in the adsorbable area.

8. The virtual object interaction method according to claim 1, further comprising:
automatically searching for and locking the target virtual object in the virtual scene in response to a trigger operation acting on a second short-range interaction skill control; and
adsorbing the target virtual object to initiate the interaction with the target virtual object.

9. A non-transitory computer-readable storage medium having stored thereon a computer program which, when being executed by a processor of an electronic device, causes the electronic device to:
display an adsorbable area on a graphical user interface in response to a touch operation acting on a first short-range interaction skill control, wherein the graphical user interface is provided by a terminal device and comprises a virtual scene and at least one short-range interaction skill control;
lock a target virtual object in the virtual scene according to an orientation of a crosshair in the adsorbable area;

adsorb the target virtual object in response to a release operation acting on the first short-range interaction skill control; and perform collision detection for the target virtual object, and initiate interaction with the target virtual object according to a result of the detection, wherein adsorbing the target virtual object in response to the release operation acting on the first short-range interaction skill control comprises:

in response to the release operation acting on the first short-range interaction skill control, and in response to detecting that a distance between a first virtual object and the target virtual object is greater than a first distance, performing ray detection in a direction of a current orientation of the crosshair; and in response to determining that a virtual object that is first detected by the ray detection in the virtual scene is the target virtual object, controlling the first virtual object to move toward the target virtual object.

10. The non-transitory computer-readable storage medium according to claim 9, wherein locking the target virtual object in the virtual scene according to the orientation of the crosshair in the adsorbable area comprises:

aiming at the target virtual object in the virtual scene according to the orientation of the crosshair in the adsorbable area; and locking the target virtual object in response to determining that an angle between the target virtual object and the orientation of the crosshair meets a starting condition of a locking function.

11. The non-transitory computer-readable storage medium according to claim 10, wherein aiming at the target virtual object in the virtual scene according to the orientation of the crosshair in the adsorbable area comprises:

controlling the crosshair to deflect in acceleration in response to detecting a touch operation that brings the crosshair close to the target virtual object; and controlling the crosshair to deflect in deceleration in response to detecting a touch operation that brings the crosshair away from the target virtual object.

12. The non-transitory computer-readable storage medium according to claim 10, wherein aiming at the target virtual object in the virtual scene-according to the orientation of the crosshair in the adsorbable area further comprises:

in response to detecting that the target virtual object moves in a direction away from the crosshair, controlling the crosshair to move in a same direction as the target virtual object moves and to aim at the target virtual object.

13. An electronic device, comprising:

a processor; and a memory configured to store instructions executable by the processor;

wherein the processor is configured to execute the executable instructions to cause the electronic device to:

display an adsorbable area on a graphical user interface in response to a touch operation acting on a first short-range interaction skill control, wherein the graphical user interface is provided by a terminal device and comprises a virtual scene and at least one short-range interaction skill control;

lock a target virtual object in the virtual scene according to an orientation of a crosshair in the adsorbable area;

adsorb the target virtual object in response to a release operation acting on the first short-range interaction skill control; and perform collision detection for the target virtual object, and initiate interaction with the target virtual object according to a result of the detection, wherein adsorbing the target virtual object in response to the release operation acting on the first short-range interaction skill control comprises:

in response to the release operation acting on the first short-range interaction skill control, and in response to detecting that a distance between a first virtual object and the target virtual object is greater than a first distance, performing ray detection in a direction of a current orientation of the crosshair; and in response to determining that a virtual object that is first detected by the ray detection in the virtual scene is the target virtual object, controlling the first virtual object to move toward the target virtual object.

14. The electronic device according to claim 13, wherein locking the target virtual object in the virtual scene according to the orientation of the crosshair in the adsorbable area comprises:

aiming at the target virtual object in the virtual scene according to the orientation of the crosshair in the adsorbable area; and locking the target virtual object in response to determining that an angle between the target virtual object and the orientation of the crosshair meets a starting condition of a locking function.

15. The electronic device according to claim 14, wherein aiming at the target virtual object in the virtual scene according to the orientation of the crosshair in the adsorbable area comprises:

controlling the crosshair to deflect in acceleration in response to detecting a touch operation that brings the crosshair close to the target virtual object; and controlling the crosshair to deflect in deceleration in response to detecting a touch operation that brings the crosshair away from the target virtual object.

16. The electronic device according to claim 14, wherein aiming at the target virtual object in the virtual scene according to the orientation of the crosshair in the adsorbable area further comprises:

in response to detecting that the target virtual object moves in a direction away from the crosshair, controlling the crosshair to move in a same direction as the target virtual object moves and to aim at the target virtual object.

* * * * *